United States Patent
Baumbach et al.

(10) Patent No.: US 10,546,425 B2
(45) Date of Patent: Jan. 28, 2020

(54) REAL PHYSICAL OBJECTS INTERACTING WITH AUGMENTED REALITY FEATURES

(71) Applicant: Disney Enterprises, Inc., Burbank, CA (US)

(72) Inventors: Elliott H. Baumbach, Porter Ranch, CA (US); Michael P. Goslin, Sherman Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 18 days.

(21) Appl. No.: 15/883,924

(22) Filed: Jan. 30, 2018

(65) Prior Publication Data
US 2019/0236843 A1    Aug. 1, 2019

(51) Int. Cl.
| | | |
|---|---|---|
| *G06T 19/00* | (2011.01) | |
| *G06T 19/20* | (2011.01) | |
| *H04W 4/021* | (2018.01) | |
| *H04W 4/06* | (2009.01) | |

(52) U.S. Cl.
CPC ............ *G06T 19/006* (2013.01); *G06T 19/20* (2013.01); *H04W 4/021* (2013.01); *H04W 4/06* (2013.01)

(58) Field of Classification Search
CPC .......... G06K 9/00664–9/00704; G06F 3/0481; G06F 3/04817; G06F 9/4443; G06F 3/04847; G06F 11/3664; G06F 3/012; G06F 3/0304; G06F 3/011–015; G06T 19/00; G06T 17/00; G06T 19/006; G06T 2215/16; H04N 5/272; H04N 2201/3245; A63F 13/10
See application file for complete search history.

(56) References Cited

U.S. PATENT DOCUMENTS

| | | | |
|---|---|---|---|
| 9,286,725 B2 | 3/2016 | Vasquez, II et al. | |
| 9,483,875 B2* | 11/2016 | Theimer | ............... G06T 19/006 |
| 9,552,673 B2 | 1/2017 | Hilliges et al. | |
| 9,724,609 B2 | 8/2017 | Kochi et al. | |
| 9,741,145 B2 | 8/2017 | Mitchell et al. | |
| 2013/0141419 A1 | 6/2013 | Mount et al. | |

(Continued)

OTHER PUBLICATIONS

Wu, et al., "Current status, opportunities and challenges of augmented reality in education", Computers & Education 62 (2013) pp. 41-49. <https://pdfs.semanticscholar.org/fd28/a381d483d936590ae01a6009e1e2e5d3362f.pdf>.

(Continued)

*Primary Examiner* — Todd Buttram
(74) *Attorney, Agent, or Firm* — Patterson + Sheridan, LLP

(57) ABSTRACT

Embodiments herein provide a method for determining, utilizing an output from a beacon device detected using one or more sensors, a physical location of an interactive device in a physical space. Additionally, the method includes receiving an indication that an augmented reality scene is being displayed, where the augmented reality scene includes the physical space and a first virtual element. The method also includes identifying a predefined dynamic based on characteristics of the interactive device and the first virtual element. Finally, the method includes determining a physical movement to perform based on the determined physical location of the interactive device and the predefined dynamic, and activating the one or more actuators to cause the determined physical movement.

17 Claims, 8 Drawing Sheets

(56) References Cited

U.S. PATENT DOCUMENTS

| | | | | |
|---|---|---|---|---|
| 2014/0225916 A1* | 8/2014 | Theimer | ............... | G06T 19/006 |
| | | | | 345/633 |
| 2014/0292807 A1* | 10/2014 | Raffa | .................... | G06T 19/006 |
| | | | | 345/633 |
| 2014/0361977 A1 | 12/2014 | Stafford et al. | | |
| 2017/0061490 A1* | 3/2017 | Ghahremani | ...... | G06Q 30/0261 |
| 2017/0151484 A1 | 6/2017 | Reilly et al. | | |
| 2018/0160282 A1* | 6/2018 | van de Poll | ....... | G06K 9/00778 |

OTHER PUBLICATIONS

Heun et al., "Smarter Objects: Using AR technology to Program Physical Objects and their Interactions", CHI 2013 Extended Abstracts, Apr. 27-May 2, 2013, Paris, France, 6 pages. <http://fluid.media.mit.edu/sites/default/files/WIP_Smarter_Objects_0.pdf>.

Huang et al., "Ubii: Towards Seamless Interaction between Digital and Physical Worlds", MM'15, Oct. 26-30, 2015, Brisbane, Australia, 10 pages. <http://symlab.ust.hk/papers/ubii.pdf>.

Leighton et al., "Augmented Reality in K-12 Education", Feb. 28, 2017, 11 pages. <https://www.researchgate.net/profile/Helen_Crompton/publication/314119800_Augmented_Reality_in_K-12_Education/links/598b8b83458515c333a339e5/Augmented-Reality-in-K-12-Education.pdf>.

Roo et al., "One Reality: Augmenting How the Physical World is Experienced by combining Multiple Mixed Reality Modalities", Aug. 30, 2017, 3 pages. <https://vimeo.com/231679882>.

\* cited by examiner

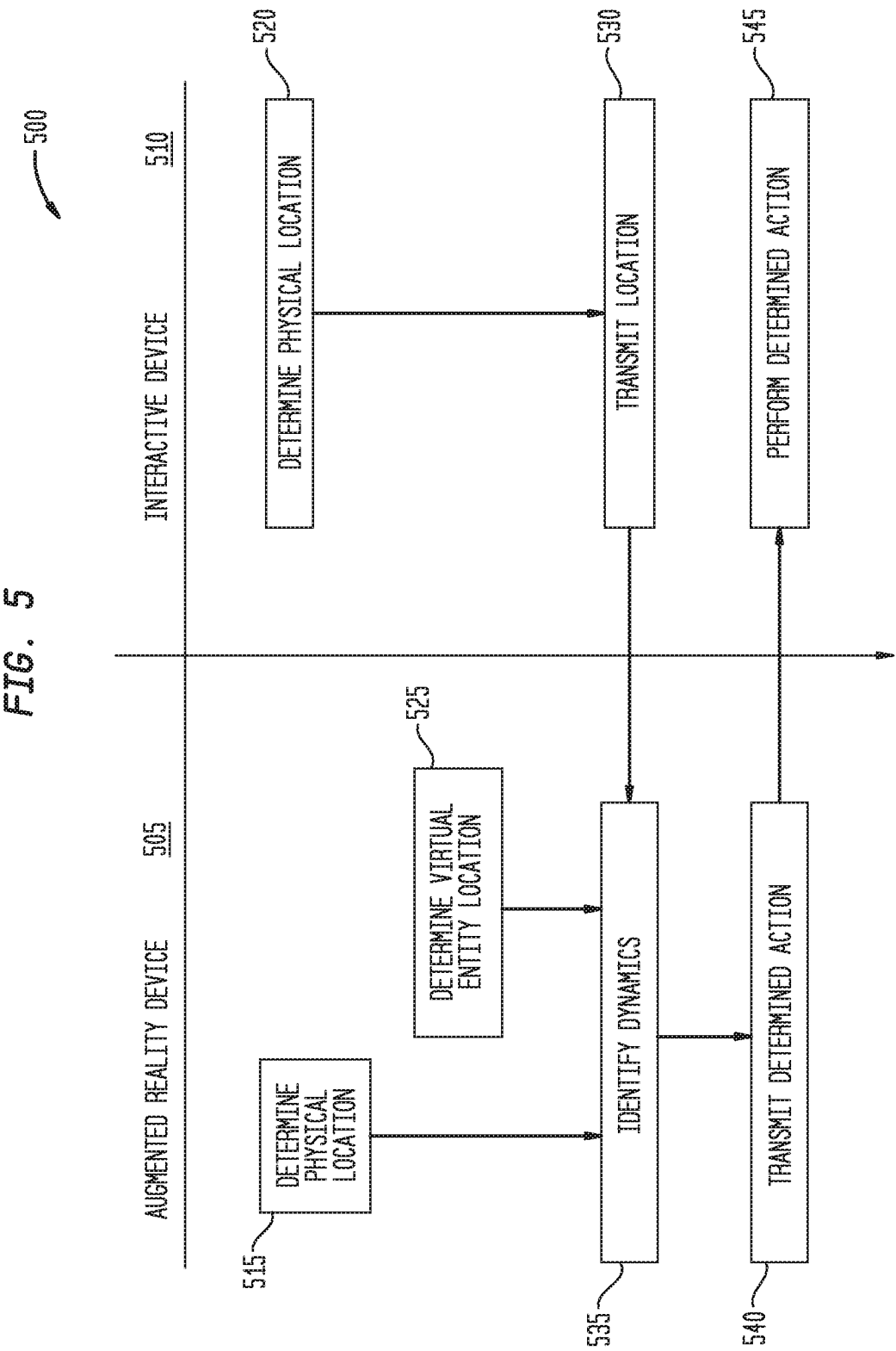

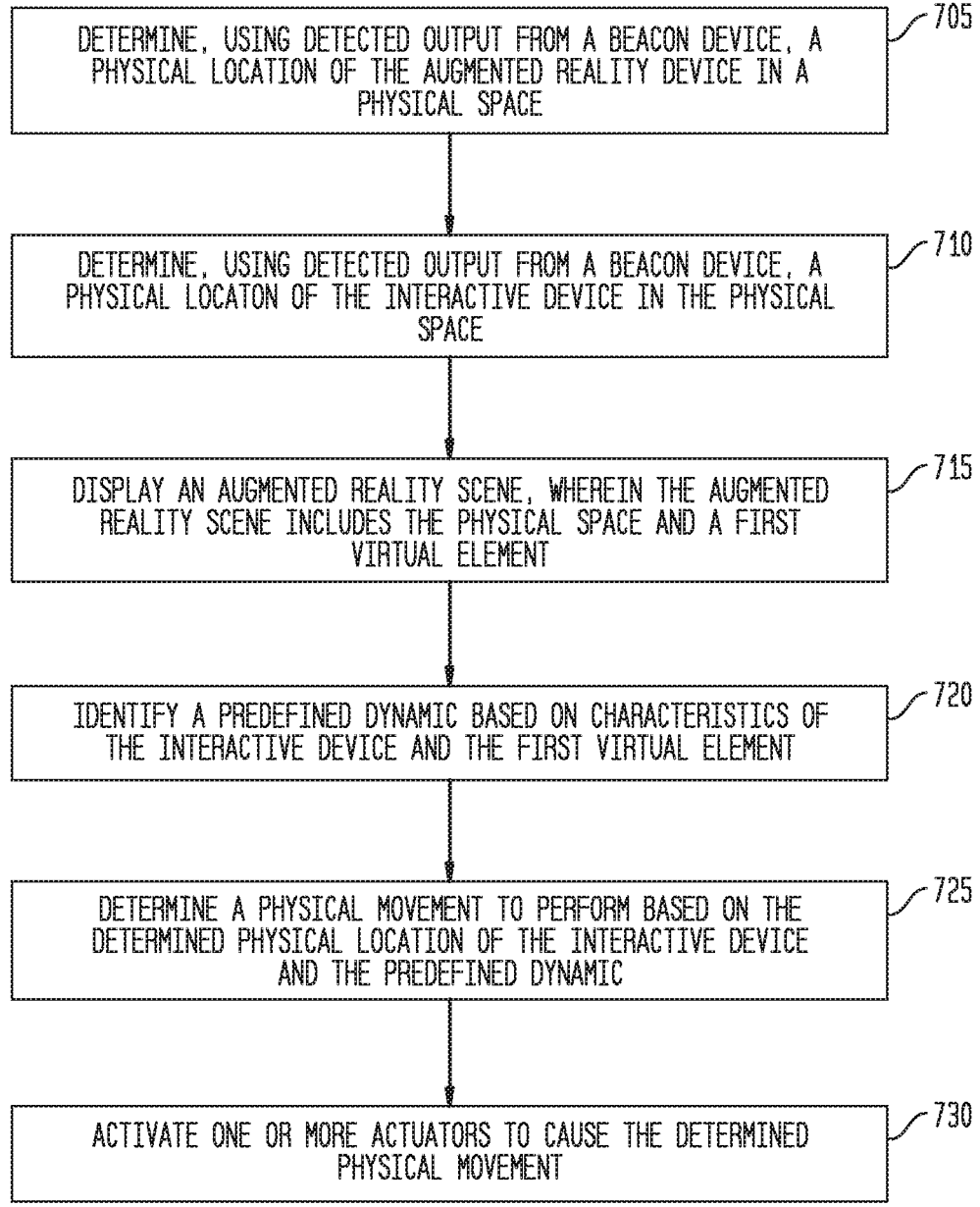

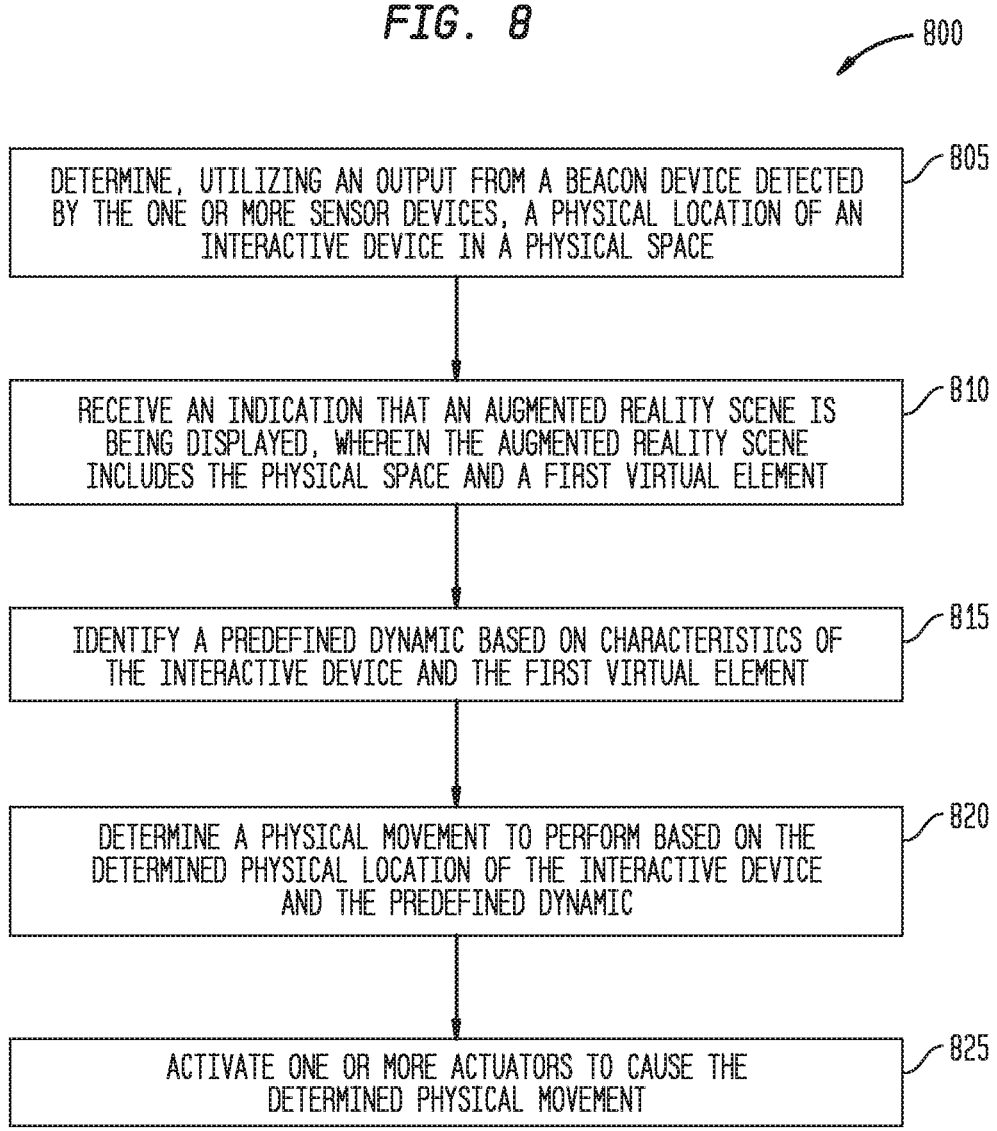

REAL PHYSICAL OBJECTS INTERACTING WITH AUGMENTED REALITY FEATURES

BACKGROUND

Field of the Invention

The present disclosure generally relates to augmented reality, and more specifically, to providing immersive interaction between physical objects and virtual elements in augmented reality scenes.

Description of the Related Art

Virtual reality (VR) and augmented reality (AR) have become increasingly popular in recent years. Virtual reality generally involves simulating a virtual environment such that the user feels as if he or she is actually present in the virtual world. With a typical VR environment, the actual physical space around the user is not visible or displayed to the user, and only virtual elements are displayed. Augmented reality involves displaying at least a portion of the real physical environment around the user, with virtual elements augmenting the physical scene, such as by projecting the virtual elements into the physical environment. Similarly, the virtual elements can be projected or displayed on a screen that is partially transparent so that the real physical world is still visible, or one or more cameras can capture the physical environment and display it to the user, along with the virtual elements.

AR allows the user to see virtual objects and elements as if they are present in the physical environment. For example, to the user, it may appear that a virtual character is standing in the user's room. Unfortunately, it is not possible for real objects to interact with virtual stimuli. For example, physical objects such as balls and action figures cannot react to the virtual elements being displayed to the user. There is a need to provide for immersive interaction between physical and virtual objects and features.

SUMMARY

One embodiment disclosed herein is a method for determining, utilizing an output from a beacon device detected using one or more sensors, a physical location of an interactive device in a physical space. Additionally, the method includes receiving an indication that an augmented reality scene is being displayed, where the augmented reality scene includes the physical space and a first virtual element. The method also includes identifying a predefined dynamic based on characteristics of the interactive device and the first virtual element. Finally, the method includes determining a physical movement to perform based on the determined physical location of the interactive device and the predefined dynamic, and activating the one or more actuators to cause the determined physical movement.

Another embodiment disclosed herein is an interactive device comprising a processor, one or more sensor devices, one or more actuators, a network interface, and a memory containing computer program code that, when executed on the processor, performs an operation. The operation comprises determining, utilizing an output from a beacon device detected using one or more sensors, a physical location of the interactive device in a physical space. Additionally, the operation includes receiving an indication that an augmented reality scene is being displayed, where the augmented reality scene includes the physical space and a first virtual element. The operation also includes identifying a predefined dynamic based on characteristics of the interactive device and the first virtual element. Finally, the operation includes determining a physical movement to perform based on the determined physical location of the interactive device and the predefined dynamic, and activating the one or more actuators to cause the determined physical movement.

Another embodiment disclosed herein is a system including a beacon device and an augmented reality device including a first processor and a first memory containing first computer program code that, when executed on the first processor, performs a first operation. The system also includes an interactive device including a second processor, one or more actuators, and a second memory containing second computer program code that, when executed on the second processor, performs a second operation. The first operation includes determining, using detected output from the beacon device, a physical location of the augmented reality device in a physical space, and displaying an augmented reality scene, where the augmented reality scene includes the physical space and a first virtual element. The second operation includes determining, using detected output from the beacon device, a physical location of the interactive device in the physical space. The second operation also includes identifying a predefined dynamic based on characteristics of the interactive device and the first virtual element. Further, the second operation includes determining a physical movement to perform based on the determined physical location of the interactive device and the predefined dynamic, and activating the one or more actuators to cause the determined physical movement.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 5 is a flow chart illustrating a workflow for providing interaction between physical devices and virtual elements, according to an embodiment disclosed herein.

FIG. 7 is a flow chart illustrating a method of providing interactive physical devices, according to one embodiment of the present disclosure.

FIG. 8 is a flow chart illustrating a method of providing interactive physical devices, according to one embodiment of the present disclosure.

DETAILED DESCRIPTION

Augmented reality scenes are unique in that they include both the physical world around the user, as well as elements and features of a virtual environment, superimposed into the physical environment. In this way, the user can observe the virtual elements as if they exist in the physical world. For example, virtual characters can appear to stand in the room the user is in.

In order to interact with virtual features, interactive devices must know the position of the virtual element (e.g., its location and orientation) relative to itself. Additionally, in order to interact with the user, the interactive device must know the position of the user. Existing approaches to augmented reality include display devices that can track virtual elements, but other physical devices do not know their own position, nor do they know the position of the virtual elements. As such, true interaction between physical devices and virtual elements is not possible with existing solutions.

In an embodiment, interactive physical devices can determine their own location in a physical scene. Similarly, the augmented reality device (e.g., a head-mounted display that displays the augmented scene) determines its location in the environment. In one embodiment of the present disclosure, the determined location of the augmented reality device and the interactive physical device can be used along with the location of the virtual elements to cause the interactive device and the virtual element to react to each other and provide a more immersive and engaging experience.

Figure 1:
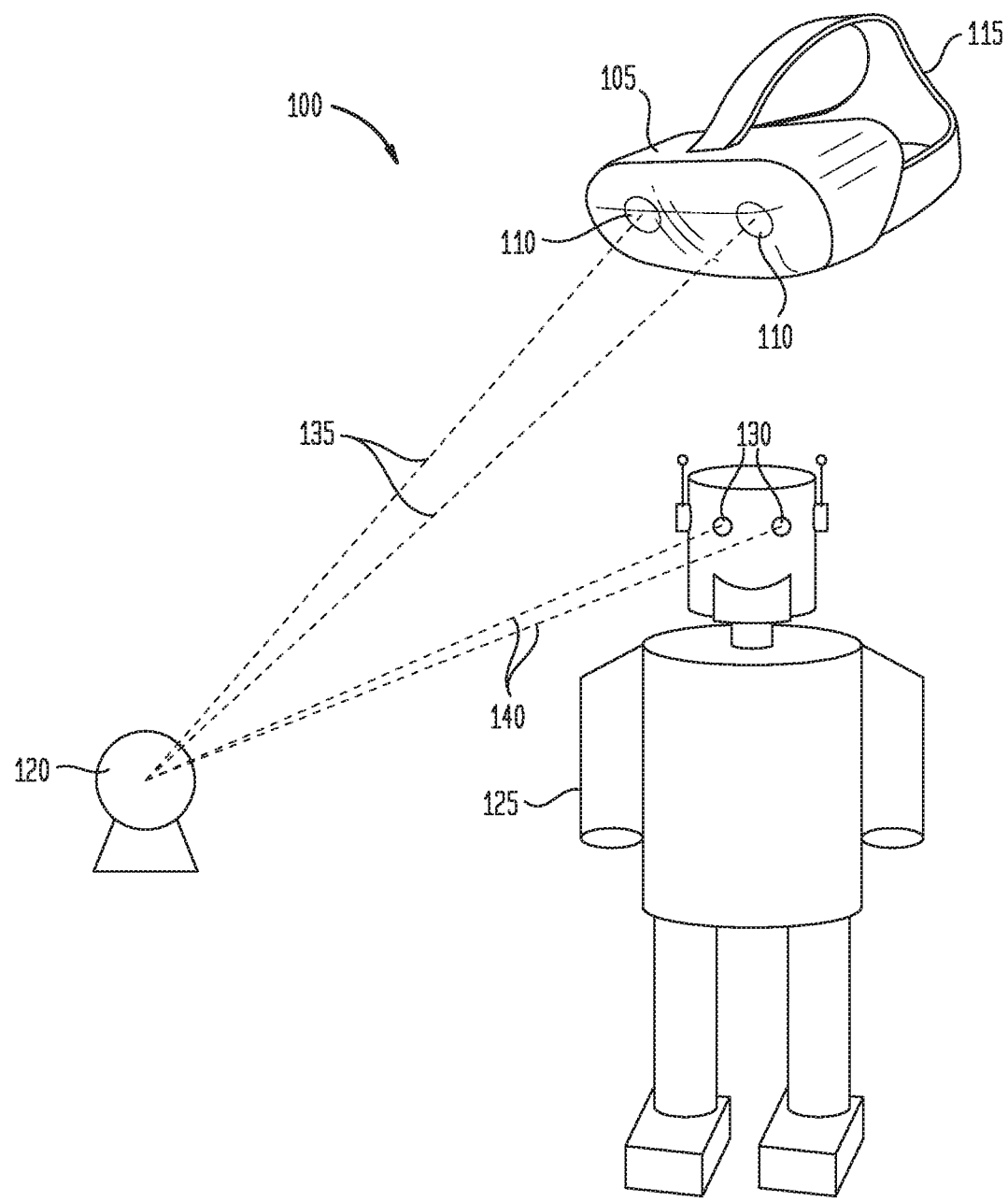
FIG. 1 illustrates a system including an augmented reality device, a beacon device, and an interactive device, according to one embodiment disclosed herein.

FIG. 1 illustrates a System 100 including an Augmented Reality Device 105, a Beacon Device 120, and an Interactive Device 125, according to one embodiment disclosed herein. As illustrated, the Augmented Reality Device 105 is a head-mounted display that the user wears using straps 115. Additionally, the Augmented Reality Device 105 includes two Sensors 110. In an embodiment, the Sensors 110 are cameras or other imaging sensors. In other embodiments, the Sensors 110 may be other types of sensor, such as ultrasonic sensors, infrared sensors, and the like. In embodiments, the Sensors 110 are utilized by the Augmented Reality Device 105 to determine its location in the physical environment.

Although the illustrated embodiment includes two Sensors 110, in some embodiments, the Augmented Reality Device 105 includes a single Sensor 110, or more than two Sensors 110. Similarly, although both Sensors 110 are illustrated as facing the same direction, in some embodiments the Sensors 110 may face in different directions from each other. In an embodiment, each Sensor 110 is a different type of sensor. Further, in some embodiments, additional sensors may be included in or on the Augmented Reality Device 105, such as accelerometers, tilt sensors, magnetometers, and the like.

In embodiments, the Augmented Reality Device 105 displays elements of virtual scenes (e.g., virtual objects, features, characters, and the like) to the user such that they appear to be present in the physical space around the user. For example, in one embodiment, the Augmented Reality Device 105 includes a screen or display, and one or more of the Sensors 110 is a camera. In such an embodiment, the screen may display the images retrieved by the Sensor 110 (e.g., images of the physical environment around the user), with the virtual elements superimposed on them.

In some embodiments, the Augmented Reality Device 105 includes a semi-transparent screen such that the physical world can be seen through the screen, and the virtual elements can be displayed or projected on it. In some embodiments, the screen is a half-silvered mirror or beam splitter that allows the virtual elements to be reflected off the screen and to the user's eyes, while allowing the user to view the physical environment as well. In an embodiment, a mobile device such as a smartphone is used as the Augmented Reality Device 105, and is placed in or on a headset or other device so that the display and various sensors of the mobile device can be utilized. Generally, any method may be used to display the augmented scene, where the augmented scene includes both the physical space around the user and one or more virtual elements.

In an embodiment, a Beacon Device 120 can be used to help locate the Augmented Reality Device 105 in the physical space. In an embodiment, the Beacon Device 120 projects light (which may be in the visible spectrum, infrared, radio waves, and the like) that can be detected by the Sensors 110 of the Augmented Reality Device 105. For example, in the illustrated embodiment, the Augmented Reality Device 105 utilizes the Sensors 110 to detect the Beacon Device 120, as illustrated by lines 135. In an embodiment, based on the detected light or signals from the Beacon Device 120, the Augmented Reality Device 105 can determine its location in the physical space relative to the Beacon Device 120.

For example, in an embodiment, the perceived location of the Beacon Device 120 to the Sensors 110 can be used to determine the direction and/or angle that the Augmented Reality Device 105 is facing at any given point in time, relative to the Beacon Device 120. Similarly, in an embodiment, the Beacon Device 120 can output different light or signals it on different sides or faces, such that the Augmented Reality Device 105 can determine where it is in relation to the Beacon Device 120 based on the light that the Sensors 110 detect. In an embodiment, the detected intensity of the Beacon Device 120 can be used to determine the distance the Augmented Reality Device 105 is from the Beacon Device 120.

In an embodiment where Augmented Reality Device 105 includes at least two Sensors 110, the differing detections may be used to determine the distance between the Augmented Reality Device 105 and the Beacon Device 120. For example, the parallax or disparity between the images detected by each Sensor 110 can be used to calculate the distance to the Beacon Device 120. In embodiments, the Augmented Reality Device 105 may utilize onboard sensors including accelerometers, magnetometers, and the like, as well as the Sensors 110 detecting one or more Beacon Device(s) 120 in order to accurately determine the location of the Augmented Reality Device 105 in the physical space (and therefore, the user) in relation to the Beacon Device 120.

In the illustrated embodiment, the Interactive Device 125 is a robot toy. In some embodiments, the Interactive Device 125 may be a character (e.g., an action figure). In other embodiments, the Interactive Device 125 is a toy such as a ball or a vehicle. Of course, the Interactive Device 125 may be any object capable of implementing embodiments of the present disclosure.

As illustrated, the Interactive Device 125 includes two Sensors 130. In an embodiment, the Sensors 130 are cameras or other imaging sensors. In other embodiments, the Sensors 130 may be other types of sensor, such as ultrasonic sensors, infrared sensors, and the like. Although the illustrated embodiment includes two Sensors 130, in some embodiments, the Interactive Device 125 includes a single Sensor 130, or more than two Sensors 130. Similarly, although both Sensors 130 are illustrated as facing the same direction, in some embodiments the Sensors 130 may face in different directions from each other, and need not occupy the "eyes" of the Interactive Device 125. In an embodiment, each Sensor 130 is a different type of sensor. Further, in some embodiments, additional sensors may be included in or on the Interactive Device 125, such as accelerometers, tilt sensors, magnetometers, and the like. In embodiments, data from the Sensors 130 is used by the Interactive Device 125 to determine its location in the physical scene.

In an embodiment, the Beacon Device 120 can also be used to help locate the Interactive Device 125 in the physical space. For example, as above, the Beacon Device 120 may be detected by the Sensors 130 of the Interactive Device 125. For example, in the illustrated embodiment, the Interactive Device 125 utilizes the Sensors 130 to detect the Beacon Device 120, as illustrated by lines 140. In an embodiment, based on the detected light or signals from the Beacon Device 120, the Interactive Device 125 can determine its location in the physical space relative to the Beacon Device 120.

For example, in an embodiment, the perceived location of the Beacon Device 120 in the frame of the Sensors 130 can be used to determine the direction and/or angle that the Augmented Reality Device 105 is facing at any given point in time, relative to the Beacon Device 120. Similarly, in an embodiment, the Beacon Device 120 can output different light or signals on different sides or faces, such that the Interactive Device 125 can determine where it is in relation to the Beacon Device 120 based on the light that the Sensors 130 detect. In an embodiment, the detected intensity of the Beacon Device 120 can be used to determine the distance the Interactive Device 125 is from the Beacon Device 120.

In some embodiments where the Interactive Device 125 includes at least two Sensors 130, the differing detections can be used to determine the distance between the Interactive Device 125 and the Beacon Device 120. For example, the parallax or disparity between the images detected by each Sensor 130 can be used to calculate the distance to the Beacon Device 120. In embodiments, the Interactive Device 125 may utilize onboard sensors including accelerometers, magnetometers, and the like, as well as the Sensors 130 detecting one or more Beacon Device(s) 120 in order to accurately determine the location of the Interactive Device 125 in the physical space.

As discussed above, in the illustrated embodiment, both the Interactive Device 125 and the Augmented Reality Device 105 are configured to determine their respective locations in the physical space. Of course, in some embodiments, multiple Interactive Devices 125 may be present in the physical environment. Similarly, in some embodiments, multiple Beacon Devices 120 can be utilized in order to ensure accurate determinations of location.

In some embodiments, the Augmented Reality Device 105 cannot determine the location of other physical objects, such as the Interactive Device 125. As discussed above, however, the Interactive Device 125 can determine its own location in various embodiments in much the same way that the Augmented Reality Device 105 can determine its own physical location. Further, although the illustrated embodiment includes a Beacon Device 120 to aid in the location detection, in some embodiments, the Augmented Reality Device 105 and the Interactive Device 125 can determine their respective locations without the need for a Beacon Device 120.

By establishing a communications pathway between the Augmented Reality Device 105 and the Interactive Device 125, each device in the physical space can determine its own location, and share that location with all other devices in the physical space. Furthermore, by utilizing a Beacon Device 120, each Augmented Reality Device 105 and Interactive Device 125 may determine its location relative to the Beacon Device 120, and thereby determine its location relative to all other Augmented Reality Devices 105 and Interactive Devices 125. Of course, in embodiments without a Beacon Device 120, the Augmented Reality Device 105 and the Interactive Device 125 may be configured to determine their respective locations relative to some other object or location such that their locations with respect to each other can be determined.

Furthermore, if the location of any virtual elements is known to any device, each Augmented Reality Device 105 and Interactive Device 125 can determine its location relative to each virtual element. For example, in an embodiment, the Augmented Reality Device 105 generates and maintains the virtual elements in order to display them to the user and thereby create an immersive atmosphere where virtual features are included in the physical space, creating an augmented scene. In such an embodiment, the Augmented Reality Device 105 may communicate the position of each virtual entity or element to the Interactive Device 125, so that the Interactive Device 125 can react and interact with the virtual elements.

Figure 2:
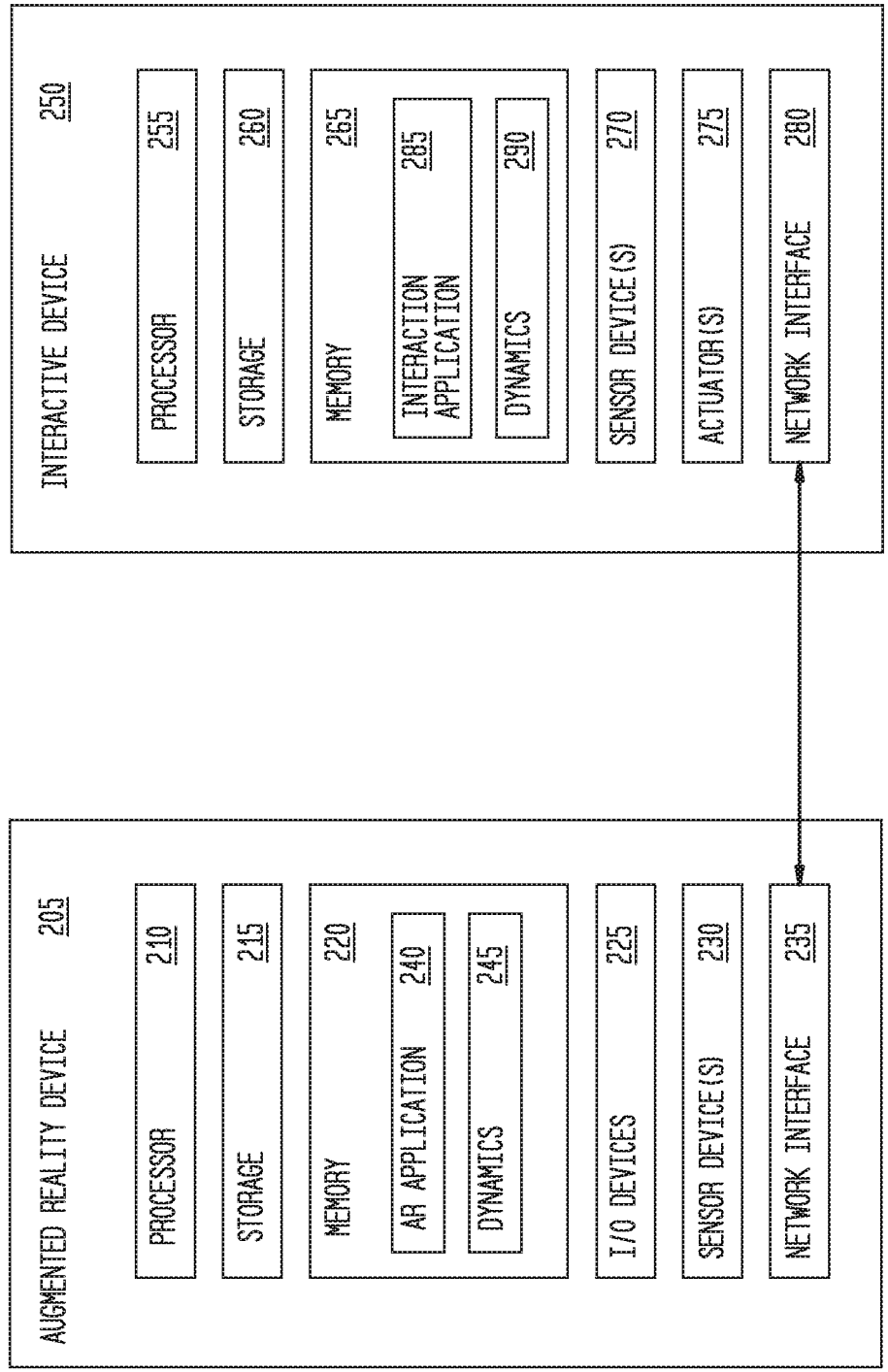
FIG. 2 is a block diagram of an augmented reality device and an interactive device, according to one embodiment disclosed herein.

FIG. 2 is a block diagram 200 of an Augmented Reality Device 205 and an Interactive Device 250, according to one embodiment disclosed herein. In the illustrated embodiment, the Augmented Reality Device 205 includes, without limitation, a Processor 210, Storage 215, Memory 220, I/O Devices 225, Sensor Device(s) 230, and a Network Interface 235. Generally, the Processor 210 retrieves and executes programming instructions stored in the Memory 220. The processor 210 is included to be representative of a single CPU, multiple CPUs, a single CPU having multiple processing cores, GPUs having multiple execution paths, and the like. The Memory 220 is generally included to be representative of a random access memory. The Network Interface 245 enables the Augmented Reality Device 205 to connect to a data communications network (e.g., wired Ethernet connection or an 802.11 wireless network). Further, while the depicted embodiment illustrates the components of a particular Augmented Reality Device 205, one of ordinary skill in the art will recognize that augmented reality devices may use a variety of different hardware architectures. Moreover, it is explicitly contemplated that embodiments of the invention may be implemented using any device or computer system capable of performing the functions described herein.

The I/O Devices 225 represent a wide variety of input and output devices, including displays, keyboards, touch screens, and so on. For instance, the I/O Devices 225 may include a display device used to provide a user interface or display the augmented reality scene. As an example, the display may provide a touch sensitive surface allowing the user to select different applications and options within an application (e.g., to select and control a virtual object). Additionally, the I/O Devices 225 may include a set of buttons, switches or other physical device mechanisms for controlling the Augmented Reality Device 205. For example, the I/O Devices 225 could include a set of directional buttons used to control aspects of a video game played using the Augmented Reality Device 205.

The Memory 220 represents any memory sufficiently large to hold the necessary programs and data structures. Memory 220 could be one or a combination of memory devices, including Random Access Memory, nonvolatile or backup memory (e.g., programmable or Flash memories, read-only memories, etc.). In addition, memory 220 and Storage 215 may be considered to include memory physically located elsewhere; for example, on another computer communicatively coupled to the Augmented Reality Device 205. Illustratively, the Memory 220 includes an AR Application 240.

In an embodiment, the Augmented Reality Device 205 is a head-mounted device (such as Augmented Reality Device 105). As discussed above, in an embodiment, the Augmented Reality Device 205 utilizes Sensor Devices 230 to track its position in a physical space. Utilizing this location and orientation information, the AR Application 240 can display virtual elements such that they appear to be in the physical space. In an embodiment, as the user moves around the space, the AR Application 240 updates the display output such that the virtual elements appear to remain stationary in the augmented scene, as if they were real physical objects in the physical space. For example, if the user moves forward in the physical space while facing a virtual element, the virtual element may grow larger such that it appears to remain in the same place in the physical space while the user approaches it. Similarly, in an embodiment, the user can walk around the virtual elements to view them from all angles, while the virtual elements remain stationary relative to the physical space.

In the illustrated embodiment, the AR Application 240 further creates and maintains the augmented scene that is displayed to the user. For example, in an embodiment, the AR Application 240 creates a virtual environment, and determines which virtual elements to include in the scene according to user input or predefined rules or features (e.g., as part of a game). The AR Application 240 further establishes the location of each virtual element based on the predefined rules, and monitors the location of each as they move around in the virtual environment created by the AR Application 240. In an embodiment, the AR Application 240 can also determine the corresponding location in the physical space for each location in the virtual world, such that each virtual element can be associated with a physical location as well.

In an embodiment, the user(s) can use various I/O Devices 225 to interact with the virtual elements. For example, in some embodiments, a handheld controller can be used to manipulate virtual elements as if they were real objects. Similarly, in an embodiment, one or more Sensor Devices 230 track the location, orientation, and movement of the user's hands to allow the user to control virtual objects with his or her own hands.

For example, if an augmented scene includes a virtual ball, the user may be able to catch and throw the ball, kick it, be struck by it, and the like. Of course, other interactions between the user and virtual elements are included within various embodiments. Non-limiting examples include swinging a virtual sword, using a virtual bow and arrow, firing a virtual blaster, and the like. In an embodiment, in addition to virtual objects, the virtual elements can include virtual characters that the user can interact with using the various I/O Devices 225.

In addition, in the illustrated embodiment, the Memory 220 additionally includes Dynamics 245. In an embodiment, the Dynamics 245 include relationships and associations among the virtual elements in a scene and various inputs from the user. In an embodiment, the Dynamics 245 provide character traits of virtual elements in the augmented scene. For example, one Dynamic 245 may provide that a virtual character (e.g., a virtual hamster) is afraid of the user. Based on this Dynamic 245, AR Application 240 can control the virtual character to move it around the augmented scene (such that it appears to move around the physical space) to avoid or stay away from the user. Similarly, in some embodiments, the Dynamics 245 includes relationships between virtual elements and the Interactive Device 250. For example, in an embodiment, a Dynamic 245 may provide that an Interactive Device 250 is afraid of (and should therefore flee from) a virtual element.

The illustrated embodiment additionally includes an Interactive Device 250. In an embodiment, the Interactive Device 250 is a physical object, such as a toy robot (e.g., Interactive Device 125), in the physical space. As discussed above, in an embodiment, the Interactive Device 250 is configured to determine its own location and/or orientation in the physical space by using the Sensor Devices 270. In the illustrated embodiment, the Interactive Device 250 includes, without limitation, a Processor 255, Storage 260, Memory 265, Sensor Device(s) 270, Actuator(s) 275, and a Network Interface 280. Generally, the Processor 255 retrieves and executes programming instructions stored in the Memory 265. Processor 255 is included to be representative of a single CPU, multiple CPUs, a single CPU having multiple processing cores, GPUs having multiple execution paths, and the like. The Memory 265 is generally included to be representative of a random access memory. The Network Interface 280 enables the Interactive Device 250 to connect to a data communications network (e.g., wired Ethernet connection or an 802.11 wireless network). Further, while the depicted embodiment illustrates the components of a particular Interactive Device 250, one of ordinary skill in the art will recognize that augmented reality devices may use a variety of different hardware architectures. Moreover, it is explicitly contemplated that embodiments of the invention may be implemented using any device or computer system capable of performing the functions described herein.

The Memory 265 represents any memory sufficiently large to hold the necessary programs and data structures. Memory 265 could be one or a combination of memory devices, including Random Access Memory, nonvolatile or backup memory (e.g., programmable or Flash memories, read-only memories, etc.). In addition, Memory 265 and Storage 260 may be considered to include memory physically located elsewhere; for example, on another computer communicatively coupled to the Interactive Device 250. Illustratively, the Memory 265 includes an Interaction Application 285. In embodiments, the Interaction Application 285 generally receives location information from the Augmented Reality Device 205 and controls the Actuator(s) 275 to cause the Interactive Device 250 to move in response to various virtual and/or physical stimuli. Additionally, in some embodiments, the Interactive Device 250 can include other output devices, such as audio (e.g., a speaker) and visual (e.g., a display or lights) that are controlled by the Interaction Application 285.

In one embodiment, the Interactive Device 250 receives, via the Network Interface 280, information about the location of the Augmented Reality Device(s) 205, which is used to determine the location of any users in the physical space. Similarly, the Interactive Device 250 receives the location of each virtual element in the augmented scene. As discussed above, the location of each virtual element is determined by the AR Application 240 as the augmented scene is rendered and the virtual elements move and interact according to the predefined simulation, game, Dynamics 245, and the like. In some embodiments, this location data is transmitted frequently or continuously by the Augmented Reality Device 205 via the Network Interface 235. That is, as soon as updated position information (e.g., location, orientation, or both) is determined for the Augmented Reality Device 205 and any virtual elements in the augmented scene, the data is transmitted to the Interactive Device 250.

In an embodiment, in addition to position information about each virtual element, the Interactive Device 250 also receives an identification of what each virtual element is, as well as associated characteristics of each virtual element. In an embodiment, the Interaction Application 285 identifies any Dynamics 290 that are associated with or relevant to the identified virtual elements. In one embodiment, the Dynamics 290 define the relationships or character traits of the Interactive Device 250 that are related to each virtual element. For example, one Dynamic 290 may provide that the Interactive Device 250 likes or dislikes a particular virtual element. Similarly, in an embodiment, a Dynamic 290 may include actions or reactions to specified virtual elements that the Interactive Device 250 should take.

For example, in one embodiment, upon determining the location of a virtual ball (e.g., by receiving data through the Network Interface 280), the Interaction Application 285 may identify a Dynamic 290 related to the virtual ball that provides that the Interactive Device 250 should attempt to catch the virtual ball. Based on repeatedly updated position information for the virtual ball, the Interactive Device 250 can then determine whether it should attempt to catch it (e.g., by utilizing the Actuators 275 to raise an arm or appendage of the Interactive Device 250), or if the Interactive Device 250 should pursue the virtual ball by moving around the physical space, or if the Interactive Device 250 should simply wait for the user to toss or kick the ball towards the Interactive Device 250.

In another embodiment, the Interaction Application 285 may identify a Dynamic 290 related to a virtual element in the augmented scene that causes the Interactive Device 250 to move towards or away from the virtual element. For example, the virtual element may be a virtual fire that the related Dynamic 290 instructs the Interactive Device 250 to avoid, or a virtual token that the Interactive Device 250 should move towards and attempt to take, according to the related Dynamic 290. Of course, any other Dynamics 290 are possible in a variety of embodiments.

Additionally, in some embodiments, the Interactive Device 250 transmits its own position information to the Augmented Reality Device 205. In such an embodiment, each device shares its own location and orientation information repeatedly, such that each device can determine where the other device is located in relation to itself, as well as where each virtual element is located in relation to each physical device.

Figure 3A:
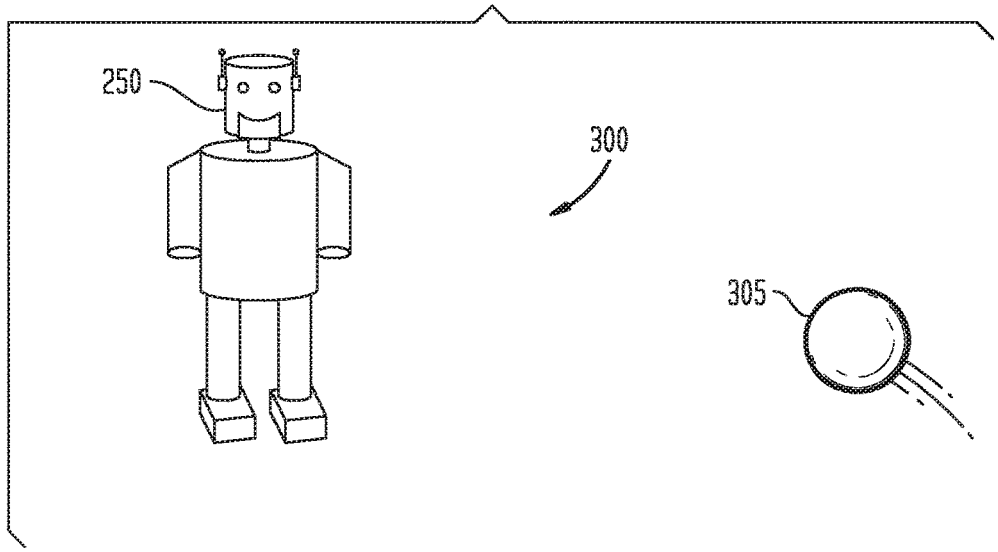
FIGS. 3A, 3B, and 3C illustrate an augmented reality scene, according to one embodiment of the present disclosure.

FIG. 3A illustrates an Augmented Reality Scene 300, according to one embodiment of the present disclosure. The illustrated Scene 300 includes a Virtual Ball 305 and an Interactive Device 250. That is, as illustrated, the Virtual Ball 305 is a virtual element being rendered and displayed to a user by an augmented reality device (such as Augmented Reality Device 105 or 205). Similarly, Interactive Device 250 is a real physical object in the physical space. In the illustrated embodiment, the Virtual Ball 305 is moving towards the Interactive Device 250. For example, as discussed above, the user may have thrown or kicked the Virtual Ball 305.

As discussed above, in the illustrated embodiment, the Augmented Reality Device 205 updates the position of the Virtual Ball 305 as it moves through the virtual space, and repeatedly renders the updated augmented scene. In this way, the Virtual Ball 305 appears to move across the augmented scene, from the location occupied by the user towards the location occupied by the Interactive Device 250.

Figure 3B:
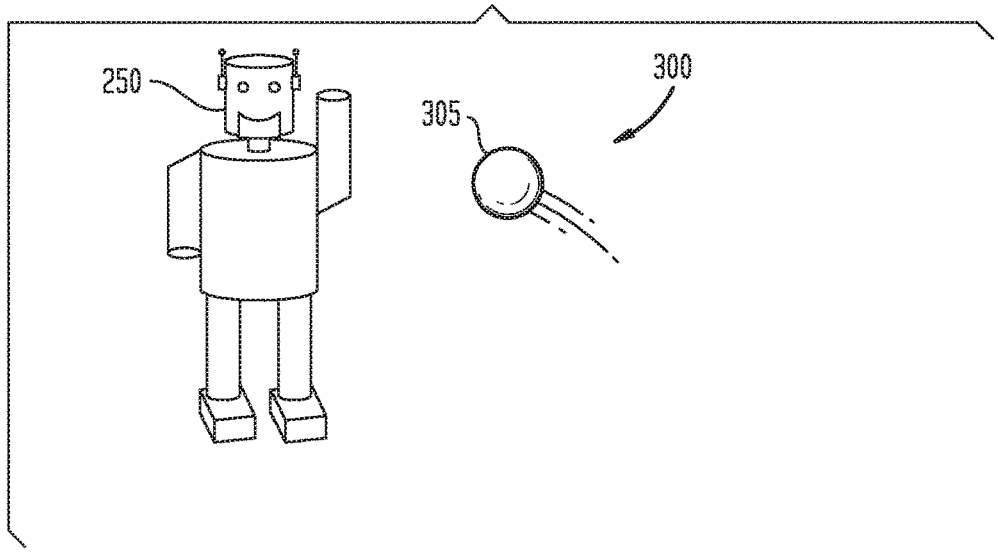

In FIG. 3B, the Virtual Ball 305 has moved closer to the Interactive Device 250. For example, as illustrated, the Virtual Ball 305 appears smaller from the perspective of the Augmented Reality Device 205, as if it is moving away. In the illustrated embodiment, the Interactive Device 250 has identified one or more Dynamics 290 related to the Virtual Ball 305, and has begun to respond accordingly. For example, as illustrated, the Interactive Device 250 has determined that in response to the Virtual Ball 305, the Actuators 275 should be activated to mimic an attempt to catch the Virtual Ball 305.

In an embodiment, several processes must be completed before interaction between the Interactive Device 250 and Virtual Ball 305 can be accomplished based on this identified Dynamic 290. For example, The Interactive Device 250 may first determine its own location, as well as the location of the Virtual Ball 305. Additionally, in an embodiment, the Interactive Device 250 can determine the orientations of the Interactive Device 250 and the Virtual Ball 305. Furthermore, in some embodiments, the Interactive Device 250 determines the movement of itself and of the Virtual Ball 305 (e.g., a directionality and speed at which each is moving).

As discussed above, in an embodiment, the Interactive Device 250 can determine its own location by utilizing one or more Sensor Devices 270. For example, in one embodiment, the Interactive Device 250 determines its location and orientation relative to a Beacon Device 120. Furthermore, in an embodiment, the Interactive Device 250 receives position information about the Virtual Ball 305 from the Augmented Reality Device 205. This positioning information may be relative to the Beacon Device 120, relative to the Augmented Reality Device 205, or relative to some other space or object (e.g., relative to something else in the physical space). Additionally, in some embodiments, the Interactive Device 250 further receives position information for the Augmented Reality Device 205.

In some embodiments, the Beacon Device 120 is utilized as an "origin" for the augmented scene. For example, if a Cartesian plane is used, each location in the augmented scene can be defined as an (x, y) coordinate, with the beacon located at (0, 0). Of course, in some embodiments, three-dimensional space is relevant, and locations are defined using (x, y, z) coordinates and the beacon may be located at (0, 0, 0). Further, in some embodiments, the coordinates also include an orientation of the virtual element or physical object. Similarly, some embodiments additionally include a movement vector for each object or virtual element.

In an embodiment, once all required position information is determined, the Interactive Device 250 can determine whether the Virtual Ball 305 is close enough that the Interactive Device 250 should attempt to catch it. Similarly, in some embodiments, the Dynamic(s) 290 may provide that if the Virtual Ball 305 is moving away from the Interactive Device 250 (or is moving towards the Interactive Device 250 but will miss the Interactive Device 250 because of poor aim), the Interactive Device 250 should take some other action, such as emitting an audio effect or chasing after the Virtual Ball 305.

In the illustrated embodiment of FIG. 3B, the Interactive Device 250 has determined that the Virtual Ball 305 is moving closer to the Interactive Device 250, and based on its movement vector, that the Virtual Ball 305 will pass closely enough to attempt to catch it. In response, the Interaction Application 285 has activated one or more Actuators 275 to move an arm of the Interactive Device 250 such that a hand or other appendage is located at the location the Virtual Ball 305 is moving towards. To accomplish this, in an embodiment, the Interactive Device 250 must determine not only its own location, but also the location of each of its appendages given the activation state of each Actuator 275.

Figure 3C:
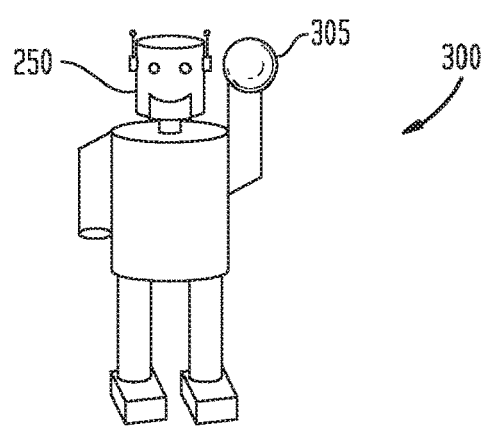

In FIG. 3C, the Interactive Device 250 has caught the Virtual Ball 305. As discussed above, in an embodiment, the Interactive Device 250 has repeatedly exchanged position information with the Augmented Reality Device 205 in order to determine the updated location of the Virtual Ball 305 as it approached the Interactive Device 250. In an embodiment, to determine whether the Virtual Ball 305 was caught or missed, the location of the appendage (e.g., its left arm) of the Interactive Device 250 is compared with the location of the Virtual Ball 305. In some embodiments, the movement of the Virtual Ball 305 is also considered (e.g., if it was moving too quickly, the Interactive Device 250 might miss the ball regardless of whether it is in the correct location). Similarly, in some embodiments, the orientation of the Interactive Device 250 and/or the Virtual Ball 305 may be considered (e.g., if the Interactive Device 250 was facing the wrong way, or the orientation of the Virtual Ball 305 was relevant to whether it could be caught).

In some embodiments, the Interactive Device 250 determines whether the Virtual Ball 305 was caught, and transmits this information to the Augmented Reality Device 205. In other embodiments, the Augmented Reality Device 205 receives location information from the Interactive Device 250 and determines whether the Virtual Ball 305 has been caught. If the Virtual Ball 305 was caught, the Augmented Reality Device 205 updates the augmented scene to display the Virtual Ball 305 such that it appears to be held by the Interactive Device 250 (as opposed to continuing to move away). Similarly, in an embodiment, as the Interactive Device 250 moves its left appendage (e.g., the one holding the Virtual Ball 305), the Augmented Reality Device 205 updates the location of the Virtual Ball 305 in the scene to match the location provided by the Interactive Device 250. Similarly, the display is updated such that it appears that the Interactive Device 250 is holding the Virtual Ball 305.

In an embodiment, the Interactive Device 250 may determine, based on the Dynamics 290, to throw the Virtual Ball 305 back towards the user. In some embodiments, the actual movement of the Interactive Device 250 is used to determine the movement vector of the Virtual Ball 305 (e.g., how hard the Virtual Ball 305 is thrown and what direction it is heading in). Of course, in various embodiments, other Dynamics 290 may provide various other actions the Interactive Device 305 should take in response to the Virtual Ball 305.

In some embodiments, rather than utilizing the physical location of each appendage of the Interactive Device 250, whether the Virtual Ball 305 makes contact with (or is caught by) the Interactive Device 250 may instead simply depend on the determined location of the Interactive Device 250 itself. Of course, in various embodiments, other virtual elements, Interactive Devices 250, and Dynamics 290 may be involved. Further, in addition to the Interactive Device 250 interacting in response to the Virtual Ball 305, the Virtual Ball 305 (or other virtual element) may react to the Interactive Device 250 (e.g., by bouncing off of the Interactive Device 250, by seeking or fleeing from the Interactive Device 250, and the like).

Figure 4A:
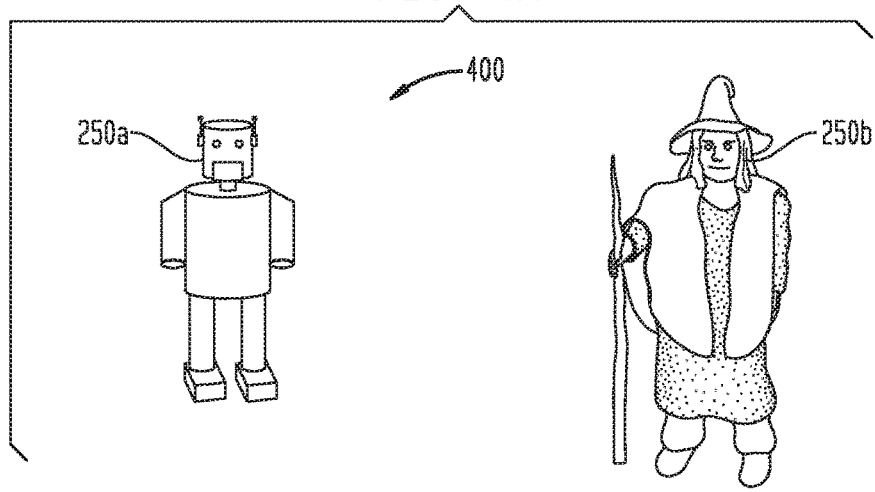
FIGS. 4A, 4B, and 4C illustrate an augmented reality scene, according to one embodiment of the present disclosure.

FIG. 4A illustrates an augmented reality Scene 400, according to one embodiment of the present disclosure. As depicted, the Scene 400 includes two Interactive Devices 250*a-b*, and no virtual elements are currently being rendered. In the illustrated embodiment, the Interactive Device 250*a* is a robot, and the Interactive Device 250*b* is a wizard. Of course, in embodiments, the Interactive Device 250 need not be characters, but may be any physical devices that can perform the functions described herein.

Figure 4B:
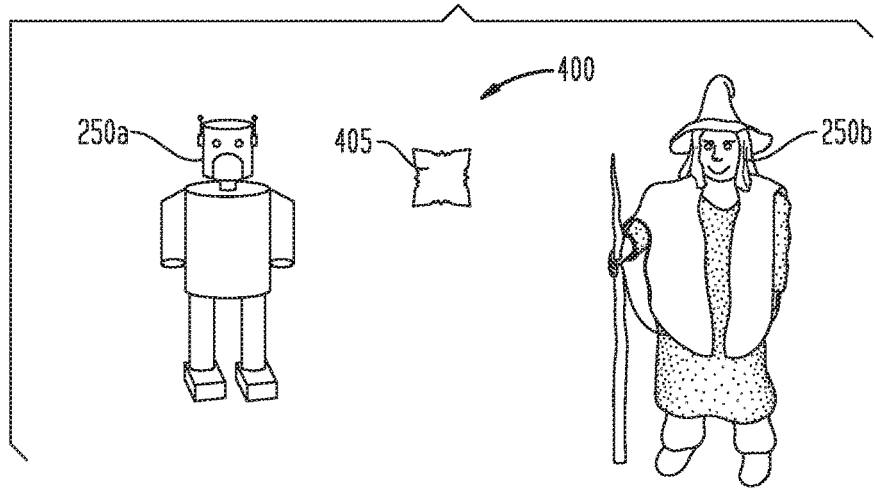

In FIG. 4B, a Virtual Emblem or Virtual Token 405 has been added to the Scene 400. For example, the user may have added the Virtual Token 405 using one or more I/O Devices 225, or it may have been added automatically via a game mechanic. In the illustrated embodiment, the Interactive Device 250*a* has identified a Dynamic 290 providing that the Interactive Device 250*a* does not like the Virtual Token 405. Further, in response to this identified Dynamic 290, Interactive Device 250*a* has determined that one or more Actuators 275 should be activated to cause the Interactive Device 250*a* to frown.

Further, in the illustrated embodiment, Interactive Device 250*b* has identified a Dynamic 290 which provides that the Interactive Device 250*b* likes the Virtual Token 405. In response to this identified Dynamic 290, the Interactive Device 250*b* has activated one or more Actuators 275 to cause the Interactive Device 250*a* to smile. Thus, in the illustrated embodiment, the Interactive Devices 250*a-b* have different Dynamics 290, and may respond differently to the same virtual stimulus (e.g., Virtual Token 405).

Figure 4C:
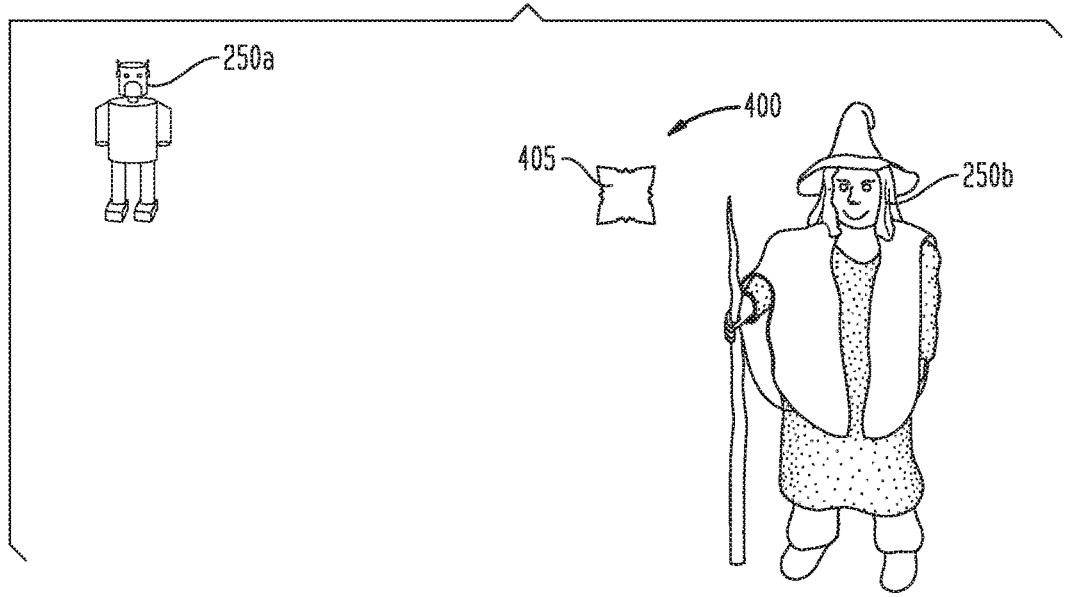

In FIG. 4C, the Interactive Device 250*a* has moved away from the Virtual Token 405, while the Interactive Device 250*b* has moved towards the Virtual Token 405. As discussed above, each Interactive Device 250*a-b* has determined one or more physical movements to make in response to the Virtual Token 405 (based on the identified relevant Dynamics 290), and has activated one or more Actuators 275 to achieve that movement. Because the Dynamic 290 identified by the Interactive Device 250*a* defines a "fear" relationship with the Virtual Token 405, the Interactive Device 250*a* has moved away from the Virtual Token 405. As discussed above, in an embodiment, this involves determining the location of the Interactive Device 250*a*, as well as the location of the Virtual Token 405.

Similarly, as illustrated, the Dynamic 290 identified by the Interactive Device 250*b* defines an "attraction" relationship with the Virtual Token 405, the Interactive Device 250*b* has moved towards from the Virtual Token 405. As discussed above, in an embodiment, this involves determining the location of the Interactive Device 250*b*, as well as the location of the Virtual Token 405.

FIG. 5 is a flow chart illustrating a Workflow 500 for providing interaction between physical devices and virtual elements, according to an embodiment disclosed herein. As illustrated, the Workflow 500 involves processes performed by both an Augmented Reality Device 505 (such as Augmented Reality Device 105 or 205) as well as by an Interactive Device 510 (such as Interactive Device 125 or 250). As illustrated, the Augmented Reality Device 505 determines its own physical location and/or orientation at block 515, as is described in more detail above. Similarly, at block 520, the Interactive Device 510 determines its own physical location and/or orientation, as discussed above. Additionally, the Augmented Reality Device 505 determines the location of any virtual entities/elements in the augmented scene at block 525.

In the illustrated Workflow 500, at block 530, the Interactive Device 510 transmits its physical location and/or orientation information to the Augmented Reality Device 505. As discussed in some embodiments, the determined locations of the Augmented Reality Device 505 and virtual elements are also transmitted to the Interactive Device 510, and the devices share location information with each other. At block 535, the Augmented Reality Device 505 identifies relevant dynamics. For example, the relevant dynamics may define interactions between the Interactive Device 510 and the virtual entities in the scene. Similarly, in the illustrated embodiment, the Augmented Reality Device 505 determines an action that the Interactive Device 510 should undertake. In an embodiment, this determination is based on the identified dynamics and the location of the devices and virtual elements in the scene.

In addition to the locations of each of the devices and virtual elements, in some embodiments, the determined action to be undertaken by the Interactive Device 510 is based on the relative locations of each or the distance between them. For example, in an embodiment where the Interactive Device 510 should dodge a virtual ball, the distance between the Interactive Device 510 and the virtual ball may be relevant. If the virtual ball is close to the Interactive Device 510 (or will pass closely), the determined physical action may involve a greater physical movement than if the virtual ball is further or will not pass as closely.

Similarly, in some embodiments, the movement vectors of each device and virtual element may be used to determine the action to be taken. In an embodiment, the movement vector includes the direction and speed at which the device or virtual element is moving. In an embodiment, if the virtual ball is approaching more rapidly, the determined physical action may involve a more rapid or sudden movement of the Interactive Device 510 than if the virtual ball was approaching more slowly. Additionally, in one embodiment, if the Interactive Device 510 is already moving, the determined action may be affected by its movement vector. For example, the determined action can be to accelerate, slow down, or change direction. However, if the Interactive Device 510 is moving in a first direction, the determined action may involve relatively small adjustments to direction, rather than completely reversing direction.

At block 540, Augmented Reality Device 505 transmits the determined action(s) to the Interactive Device 510, and the Interactive device 510 performs the action at block 545. That is, in the illustrated embodiment, the Interactive Device provides its physical location to Augmented Reality Device 505, and is informed of what action it should take based on the identified dynamics and the virtual elements. In an embodiment, the determined action can include physical movements, audio to play, visuals to display, and the like. For example, as above, the determined action may be to avoid the virtual entity (e.g., to move away from a specified location in the physical space).

Figure 6:
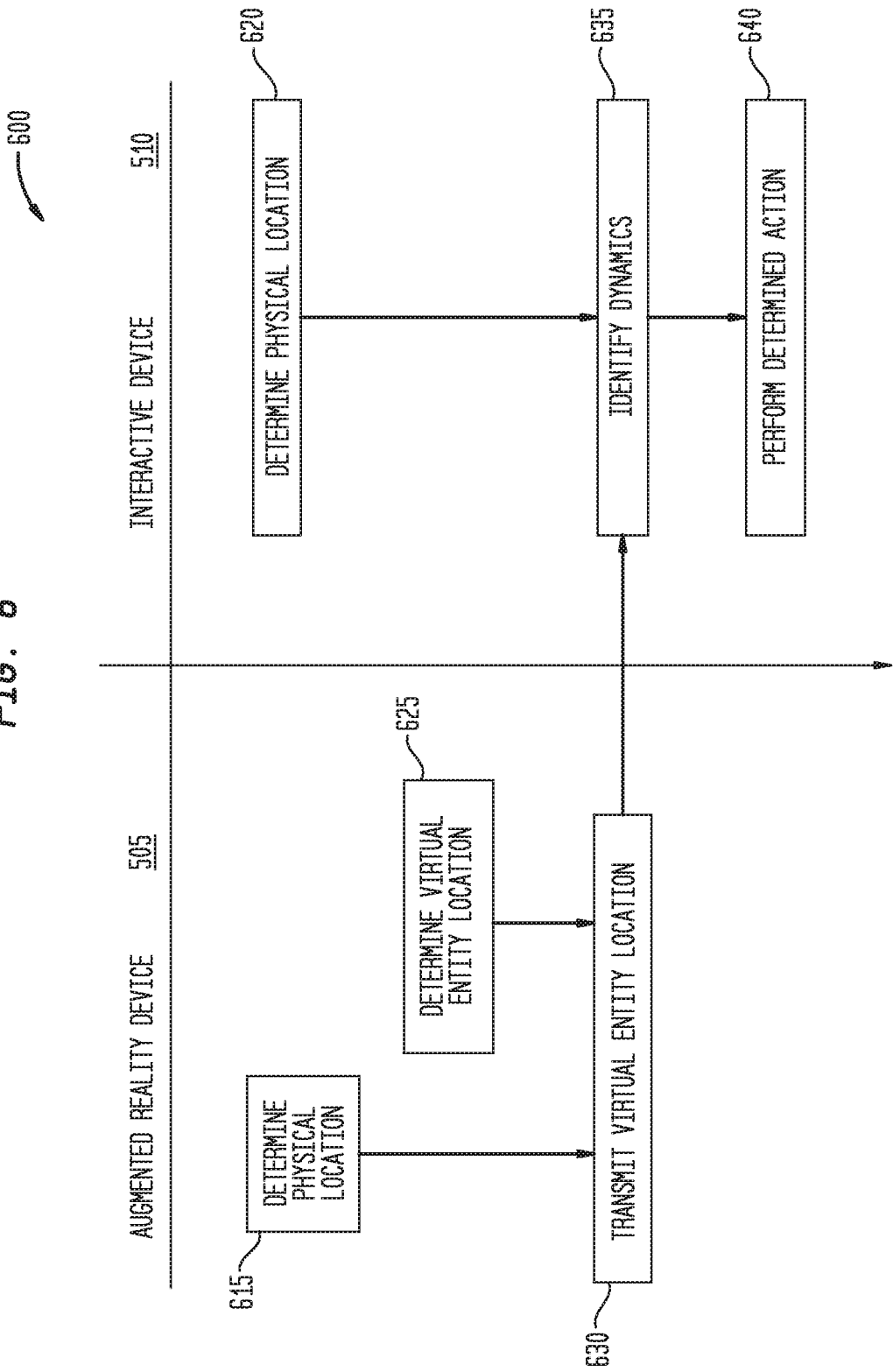
FIG. 6 is a flow chart illustrating a workflow for providing interaction between physical devices and virtual elements, according to an embodiment disclosed herein.

FIG. 6 is a flow chart illustrating a workflow 600 for providing interaction between physical devices and virtual elements, according to an embodiment disclosed herein. As illustrated, the Workflow 600 involves processes performed by both an Augmented Reality Device 505 (such as Augmented Reality Device 105 or 205) as well as by an Interactive Device 510 (such as Interactive Device 125 or 250). As illustrated, the Augmented Reality Device 505 determines its own physical location and/or orientation at block 615, as is described in more detail above. Similarly, at block 620, the Interactive Device 510 determines its own physical location and/or orientation, as discussed above. Additionally, the Augmented Reality Device 505 determines the location of any virtual entities/elements in the augmented scene at block 625.

At block 630, the Augmented Reality Device 505 transmits the location of the virtual entities or elements to the Interactive Device 510. Similarly, in some embodiments, the Augmented Reality Device 505 transmits its own location to the Interactive Device 510. Additionally, in some embodiments, the Interactive Device 510 also transmits its determined location to the Augmented Reality Device 505. At block 635, the Interactive Device identifies relevant dynamics, as discussed above. Finally, at block 640, the Interactive Device performs one or more actions that were determined based on the identified dynamics and the location of each device and virtual entity. That is, in the illustrated embodiment, the Interactive Device 510 determines which actions to take, rather than being instructed by the Augmented Reality Device 505.

In embodiments of the present disclosure, the physical devices (e.g., Augmented Reality Device 505 and Interactive Device 510) each determine their own physical locations and/or orientations, and share this information with each other. By sharing this information, more immersive interactions can be achieved between the Interactive Device 510 and one or more virtual elements that exist in an augmented scene provided by the Augmented Reality Device 505. Rather than utilizing static objects or objects that do not interact with the virtual elements, Interactive Devices 510 can determine their own locations and move and interact with virtual objects, without requiring the user to intervene. This allows users and Interactive Devices 510 to interact with the same virtual objects seamlessly and in a deeply engaging manner.

As described herein, in an embodiment, the Augmented Reality Device 505 generates the virtual elements, creates the augmented scene, and outputs the augmented scene to the user. Similarly, in some embodiments, the Augmented Reality Device 505 receives input from the user to affect the virtual elements, such as by moving them around the augmented scene. Conversely, in an embodiment, the Interactive Device 510 does not generate or create virtual elements or augmented scenes. Rather, in an embodiment, the Interactive Device 510 receives this information from the Augmented Reality Device 505, and reacts to the augmented scene and virtual elements that the Augmented Reality Device 505 has created.

In addition to interacting with virtual elements and with the user, in one embodiment, Interactive Devices 510 may interact with each other as well. In an embodiment, multiple Interactive Devices 510 also share their location information with each other, in order to facilitate interaction and immersion. For example, in one embodiment, two or more Interactive Devices 510 may pass a virtual ball to each other. Of course, in various embodiments, Interactive Devices 510 can interact with each other via any virtual element or dynamic.

Additionally, in some embodiments, multiple Augmented Reality Devices 505 (e.g., used by multiple users) can communicate with each other, and share their respective physical locations in the physical space. In this way, multiple users can interact with a single augmented scene. For example, in an embodiment, one of the Augmented Reality Devices 505 acts as the "master" device and generates and maintains the virtual elements, as discussed above. The location and orientation of each virtual element may be communicated with the other Augmented Reality Device 505, as discussed above. In this way, each of the two or more Augmented Reality Devices 505 can render the same virtual elements in the same locations in the physical space, such that both users can interact with them. Of course, there may also be one or more Interactive Devices 510 in the physical space and interacting with the same virtual elements as the user(s).

FIG. 7 is a flow chart illustrating a method 700 of providing interactive physical devices, according to one embodiment of the present disclosure. The method 700 begins at block 705, where an Augmented Reality Device 105 determines, using detected output from a beacon device, a physical location of the augmented reality device in a physical space. At block 710, an Interactive Device 125 determines, using detected output from a beacon device, a physical location of the interactive device in the physical space. The method 700 continues to block 715, where the Augmented Reality Device 105 displays an augmented reality scene, wherein the augmented reality scene includes the physical space and a first virtual element.

At block 720, a predefined dynamic is identified based on characteristics of the interactive device and the first virtual element. As discussed above, this identification may be achieved by the either the Augmented Reality Device 105 or the Interactive Device 125. The method 700 proceeds to block 725, where a physical movement to perform is determined based on the determined physical location of the interactive device and the predefined dynamic. Again, as above, this determination may be made by either the Augmented Reality Device 105 or the Interactive Device 125 in various embodiments. Finally, at block 730, the Interactive Device 125 activates one or more actuators to cause the determined physical movement.

FIG. 8 is a flow chart illustrating a method 800 of providing interactive physical devices, according to one embodiment of the present disclosure. At block 805, an Interactive Device 125 determines, utilizing an output from a beacon device detected by the one or more sensor devices, a physical location of the interactive device in a physical space. The method 800 then proceeds to block 810, where the Interactive Device 125 receives an indication that an augmented reality scene is being displayed, wherein the augmented reality scene includes the physical space and a first virtual element. Further, at block 815, the Interactive Device 125 identifies a predefined dynamic based on characteristics of the interactive device and the first virtual element. The method 800 continues to block 820, where the Interactive Device 125 determines a physical movement to perform based on the determined physical location of the interactive device and the predefined dynamic. Finally, at block 825, the Interactive Device 125 activates one or more actuators to cause the determined physical movement.

In the preceding, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, applications (e.g., AR Application 240) or related data available in the cloud. For example, the AR Application 240 could execute on a computing system in the cloud and generate the augmented scene. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system comprising:
   a beacon device;
   an augmented reality device comprising:
      a first processor; and
      a first memory containing first computer program code that, when executed on the first processor, performs a first operation; and
   an interactive device comprising:
      a second processor;
      one or more actuators; and
      a second memory containing second computer program code that, when executed on the second processor, performs a second operation;
   wherein the first operation performed by execution of the first computer program code of the augmented reality device comprises:
      determining, using detected output from the beacon device, a physical location of the augmented reality device in a physical space; and
      displaying an augmented reality scene, wherein the augmented reality scene includes the physical space and a first virtual element;
   wherein the second operation performed by execution of the second computer program code of the interactive device comprises:
      determining, by the interactive device, using detected output from the beacon device, a physical location of the interactive device in the physical space;
      upon determining, by the interactive device, that the first virtual element is being displayed by the augmented reality device:
         identifying, by the interactive device, a predefined dynamic based on characteristics of the interactive device and the first virtual element;
         receiving, by the interactive device, from the augmented reality device, an indication of a location of the first virtual element in the augmented reality scene;
         determining, by the interactive device, a physical movement to perform based on the determined physical location of the interactive device, the location of the first virtual element, and the predefined dynamic; and activating, by the interactive device, the one or more actuators to cause the determined physical movement.

2. The system of claim 1, wherein determining the physical location of the augmented reality device comprises determining the physical location of the augmented reality device relative to the beacon device, wherein the beacon device serves as an origin in a multi-dimensional coordinate system for the augmented reality scene.

3. The system of claim 1, wherein determining the physical location of the interactive device comprises determining the physical location of the interactive device relative to the beacon device, wherein the beacon device serves as an origin in a multi-dimensional coordinate system for the augmented reality scene.

4. The system of claim 1, wherein the second operation performed by execution of the second computer program code of the interactive device further comprises:

determining an audio effect to output based on the determined physical location of the interactive device and the predefined dynamic; and outputting the determined audio effect.

5. The system of claim 1, wherein the first operation performed by execution of the first computer program code of the augmented reality device further comprises:

receiving, from the interactive device, an indication of the physical movement of the interactive device; and updating the augmented reality scene such that the first virtual element moves in response to the physical movement of the interactive device.

6. The system of claim 1, wherein the physical movement of the interactive device comprises moving to a second physical location in the physical space.

7. The system of claim 1, wherein determining the physical movement is further based on a movement vector of the first virtual element, wherein the movement vector of the first virtual element comprises: (i) an orientation of the first virtual element, (ii) a direction of movement of the first virtual element, and (iii) and (iii) a speed of the movement of the first virtual element.

8. An interactive device comprising:

a processor;

one or more sensor devices;

one or more actuators;

a network interface; and a memory containing computer program code that, when executed on the processor, performs an operation comprising:

determining, by the interactive device, utilizing an output from a beacon device detected by the one or more sensor devices, a physical location of the interactive device in a physical space;

receiving, by the interactive device, an indication that an augmented reality scene is being displayed by an augmented reality device, wherein the augmented reality scene includes the physical space and a first virtual element;

upon determining, by the interactive device, that the first virtual element is being displayed by the augmented reality device:

identifying, by the interactive device, a predefined dynamic based on characteristics of the interactive device and the first virtual element;

receiving, by the interactive device, from the augmented reality device, an indication of a location of the first virtual element in the augmented reality scene;

determining, by the interactive device, a physical movement to perform based on the determined physical location of the interactive device, the location of the first virtual element, and the predefined dynamic; and activating, by the interactive device, the one or more actuators to cause the determined physical movement.

9. The interactive device of claim 8, wherein determining the physical location of the interactive device comprises determining the physical location of the interactive device relative to the beacon device, wherein the beacon device serves as an origin in a multi-dimensional coordinate system for the augmented reality scene.

10. The interactive device of claim 8, the operation further comprising:

determining an audio effect to output based on the determined physical location of the interactive device and the predefined dynamic; and outputting the determined audio effect.

11. The interactive device of claim 8, wherein the operation further comprises:

transmitting, to the augmented reality device, an indication of the physical movement of the interactive device, wherein the first virtual element moves in the augmented reality scene in response to the physical movement of the interactive device.

12. The interactive device of claim 8, wherein the physical movement of the interactive device comprises moving to a second physical location in the physical space.

13. The interactive device of claim 8, wherein determining the physical movement is further based on a movement vector of the first virtual element, wherein the movement vector of the first virtual element comprises: (i) an orientation of the first virtual element, (ii) a direction of movement of the first virtual element, and (iii) and (iii) a speed of the movement of the first virtual element.

14. A method comprising:

determining, by an interactive device, utilizing an output from a beacon device detected using one or more sensors, a physical location of the interactive device in a physical space;

receiving, by the interactive device, an indication that an augmented reality scene is being displayed by an augmented reality device, wherein the augmented reality scene includes the physical space and a first virtual element;

upon determining, by the interactive device, that the first virtual element is being displayed by the augmented reality device:

identifying, by the interactive device, a predefined dynamic based on characteristics of the interactive device and the first virtual element;

receiving, by the interactive device, from the augmented reality device, an indication of a location of the first virtual element in the augmented reality scene;

determining, by the interactive device, a physical movement to perform based on the determined physical location of the interactive device, the location of the first virtual element, and the predefined dynamic; and activating, by the interactive device, the one or more actuators to cause the determined physical movement.

15. The method of claim 14, wherein determining the physical location of the interactive device comprises determining the physical location of the interactive device relative to the beacon device, wherein the beacon device serves as an origin in a multi-dimensional coordinate system for the augmented reality scene.

16. The method of claim 14, wherein the operation further comprises:
    transmitting, to the augmented reality device, an indication of the physical movement of the interactive device, wherein the first virtual element moves in the augmented reality scene in response to the physical movement of the interactive device.

17. The method of claim 14, wherein determining the physical movement is further based on a movement vector of the first virtual element, wherein the movement vector of the first virtual element comprises: (i) an orientation of the first virtual element, (ii) a direction of movement of the first virtual element, and (iii) and (iii) a speed of the movement of the first virtual element.

* * * * *

UNITED STATES PATENT AND TRADEMARK OFFICE
CERTIFICATE OF CORRECTION

PATENT NO. : 10,546,425 B2
APPLICATION NO. : 15/883924
DATED : January 28, 2020
INVENTOR(S) : Elliott H. Baumbach et al.

Page 1 of 1

It is certified that error appears in the above-identified patent and that said Letters Patent is hereby corrected as shown below:

In the Specification

In Column 10, Line 26, delete "The" and insert -- the --, therefor.

In the Claims

In Column 19, Line 43, in Claim 7, delete "and (iii) and (iii)" and insert -- and (iii) --, therefor.

In Column 20, Line 41, in Claim 13, delete "and (iii) and (iii)" and insert -- and (iii) --, therefor.

In Column 21, Line 22, in Claim 17, delete "and (iii) and (iii)" and insert -- and (iii) --, therefor.

Signed and Sealed this
Twenty-fourth Day of March, 2020

Andrei Iancu
*Director of the United States Patent and Trademark Office*